F. CRAWFORD, Sr.
STOP MOTION FOR KNITTING MACHINES.
APPLICATION FILED NOV. 6, 1915.
1,203,497.
Patented Oct. 31, 1916.
5 SHEETS—SHEET 2.
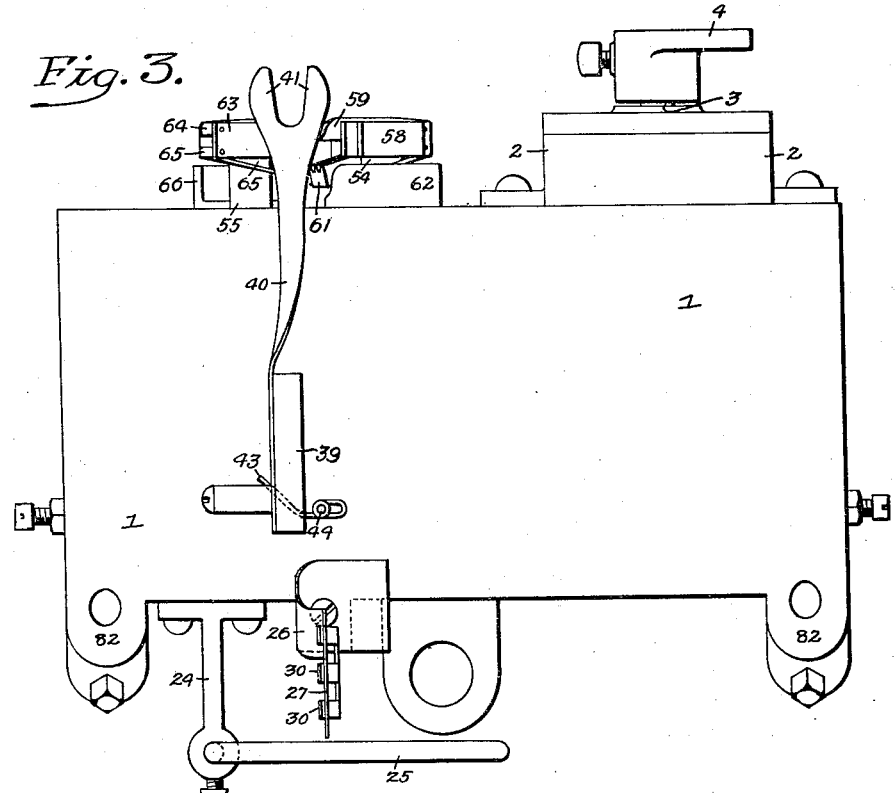
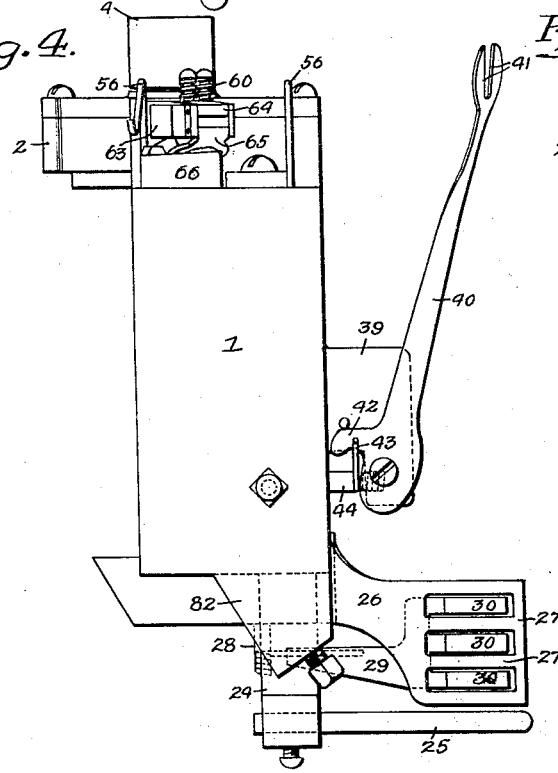
Inventor,—
Frank Crawford, Sr.
by his Attorneys.

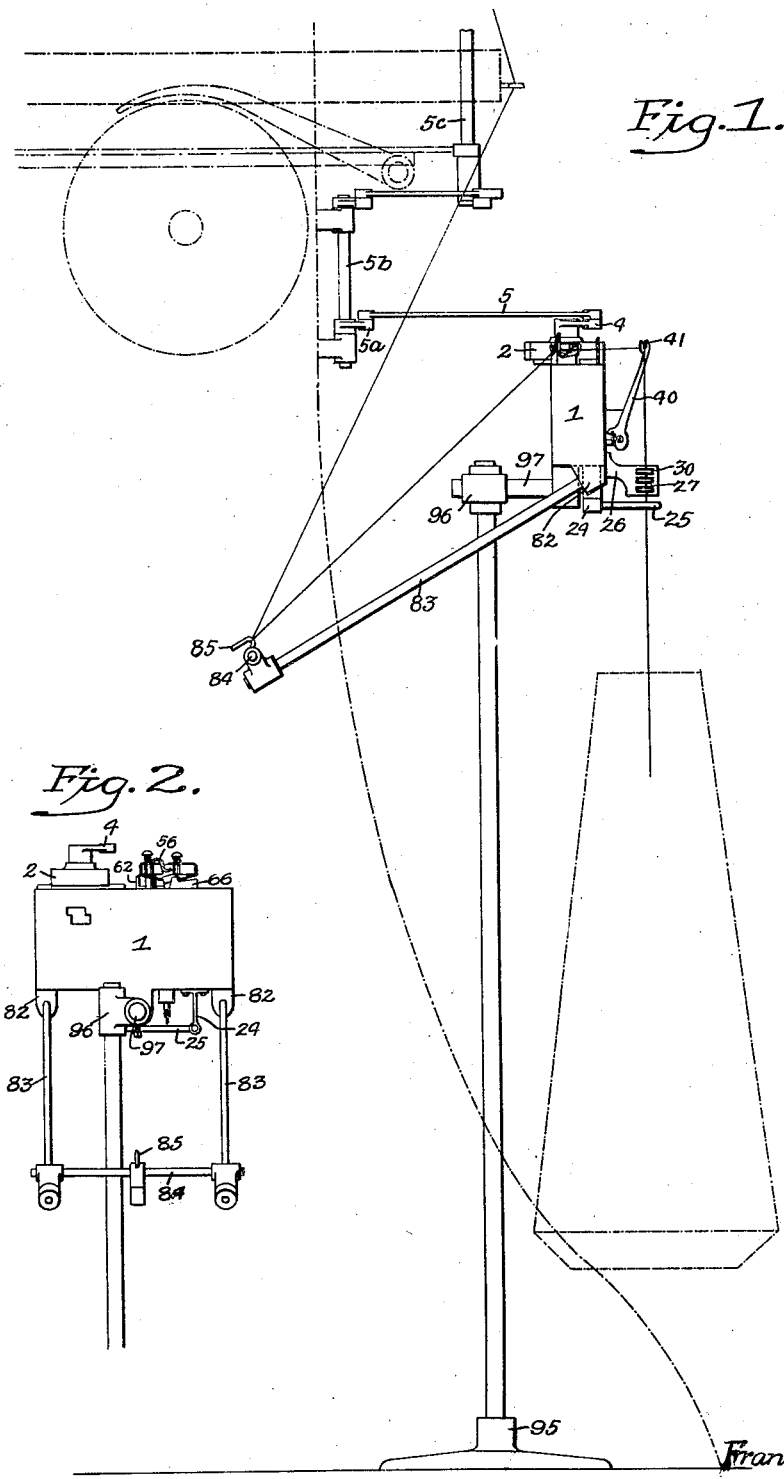

F. CRAWFORD, Sr.
STOP MOTION FOR KNITTING MACHINES.
APPLICATION FILED NOV. 6, 1915.
1,203,497.
Patented Oct. 31, 1916.
5 SHEETS—SHEET 3.
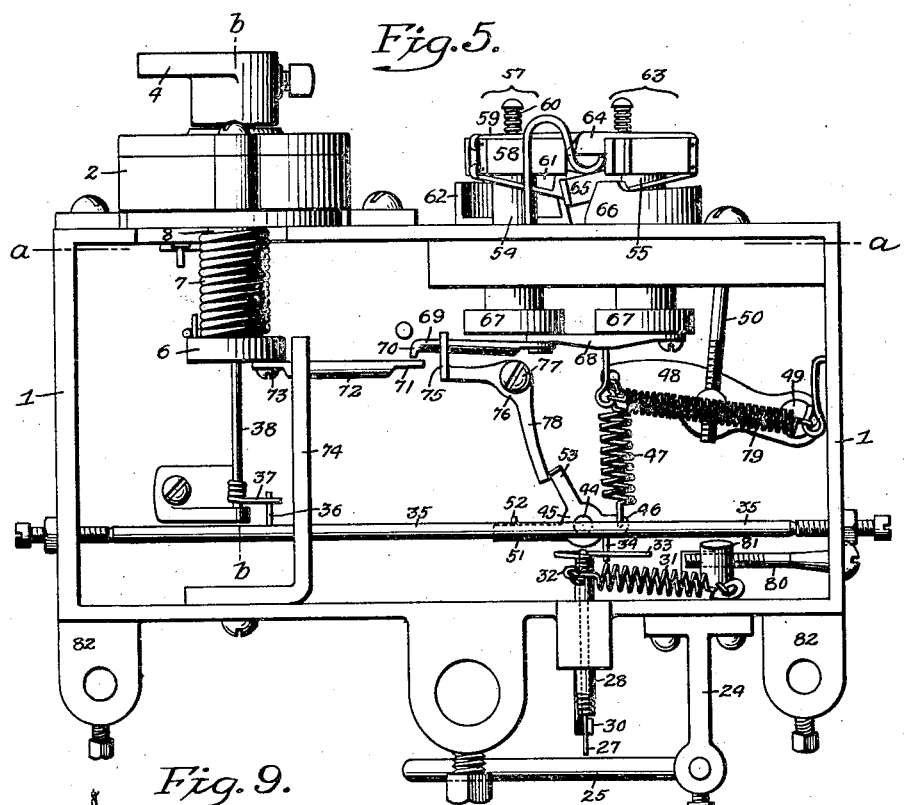
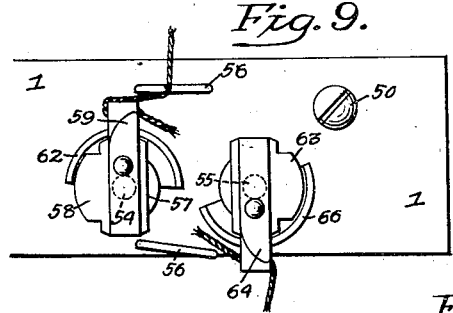
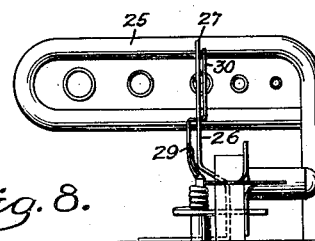
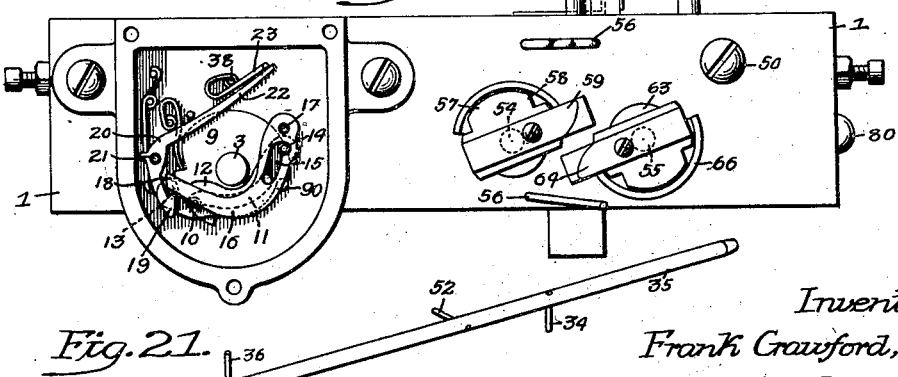
Inventor-
Frank Crawford, Sr.
by his Attorneys.
Howson & Howson

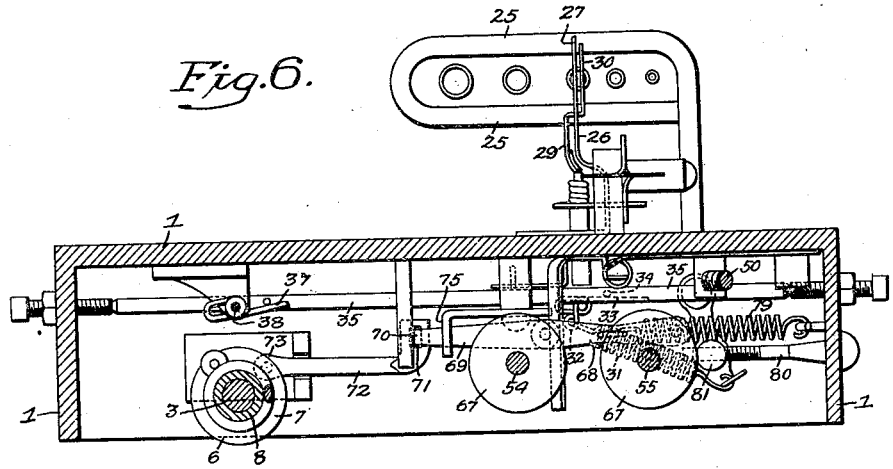
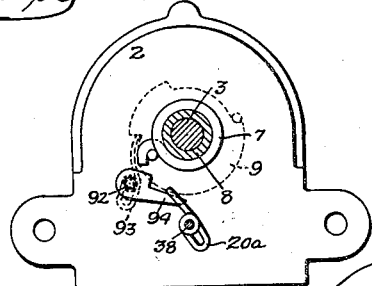
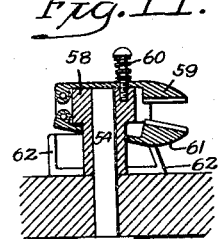
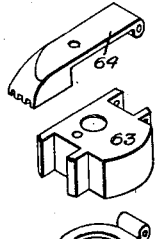
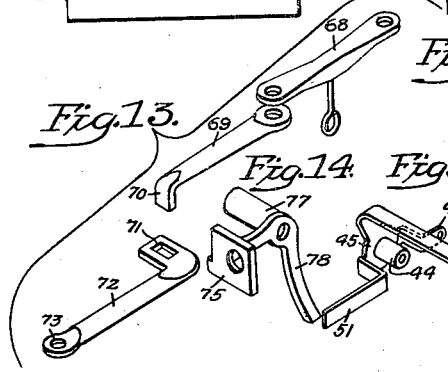
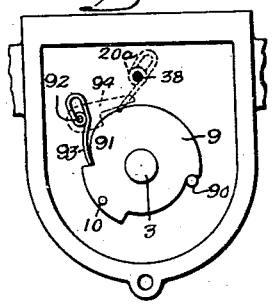
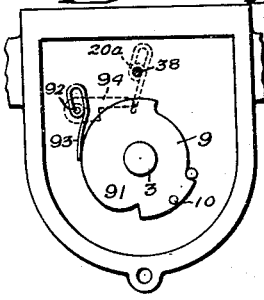
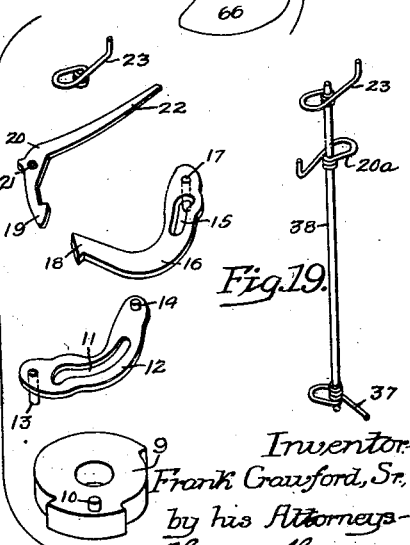

F. CRAWFORD, Sr.
STOP MOTION FOR KNITTING MACHINES.
APPLICATION FILED NOV. 6, 1915.
1,203,497.
Patented Oct. 31, 1916.
5 SHEETS—SHEET 5.
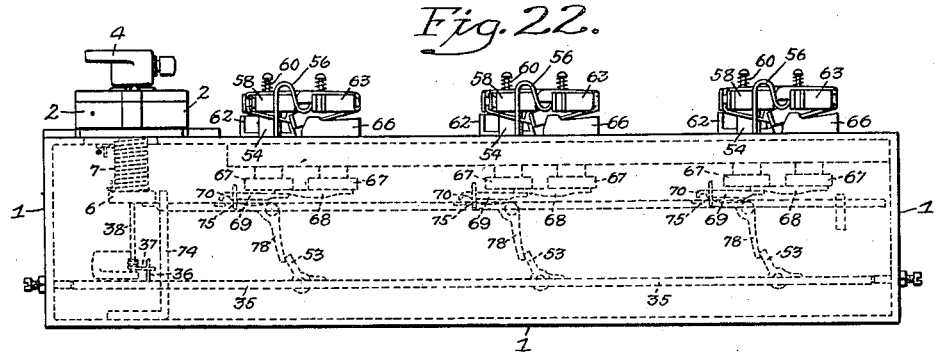
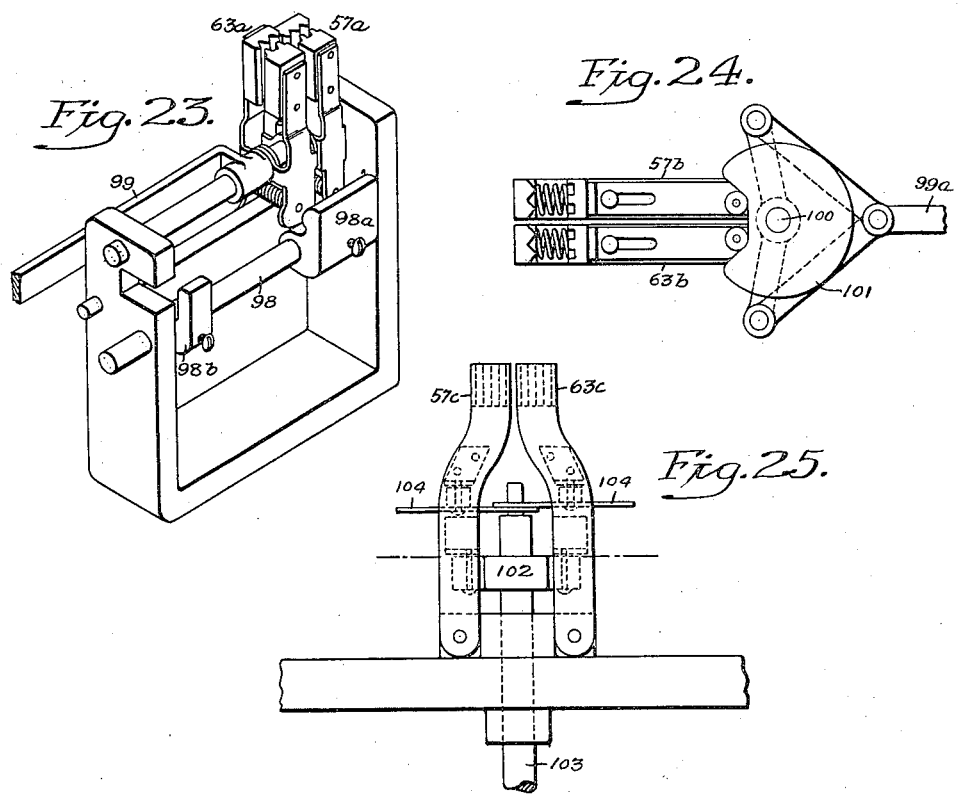
Inventor
Frank Crawford, Sr.
by his Attorneys

UNITED STATES PATENT OFFICE.

FRANK CRAWFORD, SR., OF NEW BRUNSWICK, NEW JERSEY, ASSIGNOR TO THE CRAWFORD MANUFACTURING COMPANY, OF NEW BRUNSWICK, NEW JERSEY, A CORPORATION OF NEW JERSEY.

STOP-MOTION FOR KNITTING-MACHINES.

1,203,497. Specification of Letters Patent. Patented Oct. 31, 1916.

Application filed November 6, 1915. Serial No. 59,996.

*To all whom it may concern:*

Be it known that I, FRANK CRAWFORD, Sr., a citizen of the United States, and a resident of New Brunswick, county of Middlesex, State of New Jersey, have invented certain Improvements in Stop-Motions for Knitting-Machines, of which the following is a specification.

My invention relates to certain improvements in stop motions actuated when a loose end appears, or when a thread breaks, or when a thread is under tension due to a knot appearing in the thread, or when a thread catches on a bobbin.

The invention is particularly adapted for use in connection with knitting machines in general, and the particular mechanism shown in the drawings is adapted to machines of the type in which the bobbins are located below the knitting head, but it will be understood that it may be used in other types of knitting machines without departing from the essential features of the invention.

One object of my invention is to provide an accurate and positive trip mechanism through which the driving means of the machine is stopped.

Another object of the invention is to construct a stop motion of the type above described so that it will break the thread should a knot occur.

A still further object of the invention is to provide independent means for releasing the stop motion when a loose end appears or the thread breaks, and independent means for releasing the stop motion when the thread is under tension due to a knot or a thread catching on a bobbin.

The trip mechanism illustrated and described in this application can be used in a device of a different type, such as that illustrated in an application for patent filed by me on the 27th day of November, 1915, under Serial No. 63,796.

In the accompanying drawings:—Figure 1, is a side view of a portion of a knitting machine shown in dotted lines and illustrating the location of my improved stop mechanism; Fig. 2, is a rear view of the stop mechanism as it is applied to a knitting machine; Fig. 3, is a front view of the casing, showing the thread guides; Fig. 4, is an end view of the casing; Fig. 5, is a rear view of the casing with the cap plate removed; Fig. 6, is a sectional plan view of the casing on the line *a—a*, Fig. 5; Fig. 7, is a tranverse sectional view on the line *b—b*, Fig. 5; Fig. 8, is a plan view of the casing with the cap plate of the trip mechanism removed and showing the pivoted grippers in the normal position; Fig. 9, is a plan view of a portion of the casing, showing the pivoted grippers separated and the thread broken; Fig. 10, is an inverted sectional plan view on the line *c—c*, Fig. 7; Fig. 11, is a sectional view through one of the jaws; Fig. 12, is a perspective view showing parts of one of the jaws detached; Fig. 13, is a detached perspective view of the connecting rods of the jaws; Figs. 14 and 15, are perspective views of two of the levers of the mechanism; Fig. 16, is a view showing the elements of the trip mechanism detached; Figs. 17 and 18, are diagrammatic views showing two positions of the cam of the trip mechanism; Fig. 19, is a detached perspective view of the operating shaft of the trip mechanism; Fig. 20, is a detached perspective view of the pawl and latch of the trip mechanism; Fig. 21, is a detached perspective view of the horizontal operating shaft; Fig. 22, is a side view of the casing showing three pairs of thread breakers and a single trip mechanism; and Figs. 23, 24, 25 and 26, are views of modifications of the thread breaking mechanism.

Referring in the first instance to Figs. 5, 6 and 7, 1 is the casing inclosing the operating mechanism. 2 is a casing located on the casing 1 and inclosing the trip mechanism. 3 is a vertical shaft mounted in an elongated bearing 8 and having a crank arm 4 at its upper end which is connected by a rod 5 to an arm 5ª on a shaft 5ᵇ, which in turn is connected to the belt shifting mechanism 5ᶜ of the knitting machine. The connection between this crank arm 4 and the belt shifting mechanism will vary according to the type of knitting machine to which the stop motion is applied. At the lower end of the shaft 3 is a cap 6 and a spring 7 surrounds the bearing 8 in which the shaft 3 is mounted, and one end of this spring is attached to the cap and the other end is attached to the casing, as shown in Figs. 5 and 10. This spring is sufficiently strong to actuate the mechanism leading to the belt shifting mechanism when the trip mechanism within the casing 2 is released.

Referring to Figs. 8 and 16, secured to the shaft 3 is a cam disk 9 having a pin 10, which is adapted to a slot 11 in a lever 12 pivoted at 13 and having a pin 14 adapted to a slot 15 in a lever 16 pivoted at 17 and having a hook 18 at its outer end which is arranged to engage the hook 19 of a trip lever 20 pivoted at 21 and having an arm 22 with which a lever 23 comes in contact when a shaft 38 is turned by the mechanism controlled by the threads. A spring holds the lever in the projected position.

When the parts are in the position shown in Fig. 8, with the hook 18 in engagement with the hook 19 of the lever 20 the thread is running freely through the stop motion to the knitting machine, but should the thread break, or a knot occur, then the trip mechanism will actuate the lever 23 which will push upon the arm 22 of the lever 20 and will release the catch and the levers 16 and 12 and will allow the spring 7 to turn the shaft 3 with sufficient force to shift the belt shifting mechanism and to stop the rotation of the knitting machine.

The movement of the cam disk 9 is limited by a pin 90, Figs. 17 and 18, and the disk has an eccentric portion 91 forming a cam.

A short rock shaft 92, Fig. 20, extends through the bottom of the casing 2 and has an arm 93 at its upper end and an arm 94 at its lower end. The arm 93 rests against the portion 91 of the cam disk so that, when the shaft 3 is released, the rock shaft 92 will turn from the position shown in Fig. 17 to that shown in Fig. 18. The arm 94 is in the path of an arm 20ª on the shaft 38, so that, when the shaft 3 is released, the arm 94 will re-set the mechanism prior to the turning of the shaft 3 to coil the spring. This enables the operator to thread the stop motion before setting the trip mechanism. When the trip mechanism is set by turning the shaft 3 the cam 9 is moved into the position shown in Fig. 17 and the arm 94 is moved away from the arm 20ª of the shaft 38.

Secured to a depending bracket 24 is a guide plate 25 for the thread. This plate has a series of holes of different diameters for the passage of different sized threads, according to the sizes used in the machine, and directly above this guide plate is a grid 26 having a series of horizontal bars 27 spaced apart, and mounted on a rock shaft 28 is an arm 29 having fingers 30 adapted to pass through the spaces between the bars 27.

The thread from the bobbin passes through one of the holes in the plate 25 and between the fingers 30 and the bars 27, so that the thread holds the fingers and the arm 29 in position against the pressure of a spring 31 attached to an arm 32 on the upper end of the shaft 28. The arm 33 on the shaft 28 comes in contact with an arm 34 on a rock shaft 35 adapted to bearings in the casing 1 and on this rock shaft is an arm 36 which is arranged to strike an arm 37 on the vertical shaft 38 which passes through the casing 1 and into the casing 2 and has the arm 23 described above so that, when the thread is broken, the fingers 30 are released and the spring 31 turns the shaft 28, which, in turn, rocks the shaft 35 and turns a shaft 38 which releases the trip mechanism. The tension of the spring 31 is regulated by a screw 80 which controls a lever 81 to which the spring 31 is attached, see Figs. 5 and 6.

Projecting from the front of the casing 1 is a bearing 39 for the lever 40 having a fork 41 at its upper end. The short arm 42 of this lever comes in contact with an arm 43 on a horizontal shaft 44 extending through the casing and on the inner end of this shaft is a three-armed lever 45, shown clearly in Fig. 15. One arm 46 of this lever is attached to a spring 47, which, in turn, is connected to a regulating lever 48, which is pivoted at 49 and is adjusted by means of a screw 50 so that more or less tension can be applied to the spring 47. The arm 51 of the lever 45 comes in contact with an arm 52 on the horizontal rock shaft 35 so that, when the shaft 44 is turned, the trip mechanism will be released through the rock shaft 35 and the mechanism hereinbefore described.

The arm 53 of the lever 45 actuates a lever which controls the gripping mechanism for breaking the thread which I will now proceed to describe.

On the upper portion of the casing, in the present instance, are two parallel shafts 54 and 55, each of which carries at its upper end a gripper for engaging the thread. The gripper, however, is opened when the parts are in the normal position, as in Fig. 8, so as to allow the thread to pass over the guides 56 and through the gripper. The gripper 57 on the shaft 54 has a fixed head 58 and a normally fixed gripper having a jaw 59, which is held in place by a spring 60 and will yield only under excessive strains. The lower jaw 61 is loose and is controlled by a cam plate 62 so that, when it is shifted from the position illustrated in Fig. 8 to that illustrated in Fig. 9, the lower jaw closes upon the upper jaw and holds the thread. The jaws in the present instance are serrated so as to firmly hold the thread and to prevent it slipping. The gripper 63 on the shaft 55 has a spring-pressed upper jaw 64 and a loose jaw 65 which is controlled by a cam plate 66, but the raised portion of this cam plate is short so that, when it is turned into the full position, Fig. 9, the jaw is released to allow the end of the thread, after it is broken, to continue feeding to the knitting head, but during the time that the jaws are moving from the position illustrated in Fig. 8 to that illustrated in Fig. 9, the thread is held so that it will be broken by the movement of the jaws, as clearly shown in Fig. 9. The portion of the thread leading from the bobbin preferably remains in its jaw while the end of the other thread leading to the needle is free, but in some instances the cam may be cut so as to allow the jaw to release the thread after being broken.

The shafts of the jaws are actuated from the shaft 3. On the lower end of each shaft 54 and 55 is a disk 67 and the two disks are connected by a rod 68, and connected to one of the pins attaching the rod to the disk is an arm 69 having a depending end 70, which is arranged to enter an opening 71 in a rod 72 attached at 73 to the cap 6 when released by strain upon the thread. This rod 72 is guided by a bearing 74 of any suitable form.

A lever 76 (Fig. 15) pivoted at 77 has an arm 78 in the path of an arm 53 of the lever 45, and has an arm 75 (Fig. 14) perforated for the passage of the arm 69, so that, when the thread is under tension, the arm 53 will be moved, releasing the lever 76, allowing the arm 69 to drop and its projecting end will enter the opening 71 in the rod 72, so that the moment the trip mechanism is operated to stop the machine the thread will be broken by the movement of the grippers. A spring 79 immediately returns the jaws to their normal position after which a new thread can be inserted between the jaws.

The casing of the stop motion is mounted on a stand 95, in the present instance secured to the floor, and this stand has a vertical supporting rod having an adjustable head 96 in which is an adjustable rod 97 to which the casing is secured.

Mounted in bearings 82, in the present instance at the bottom of the casing, are arms 83, which are arranged at an angle, as shown in Figs. 1 and 2, and carry at their outer ends a cross bar 84 on which is an adjustable hook 85 around which the thread passes from the stop motion to the needles.

I have shown, in Fig. 1, a single stop motion arranged on one side of the knitting machine, but it will be understood that one or more stop motions may be arranged on both sides of the machine, and there may be as many thread guides and jaws as there are bobbins, by merely duplicating the mechanism, as shown in Fig. 22.

A single trip mechanism may be combined with as many thread guides and jaws as desired. The number of individual stop motions will depend upon the particular machine to which it is applied and the number of ends required.

The operation is as follows:—The mechanism, as above described, is located, in the present instance, between the base of the knitting head and the bobbins and the thread from a bobbin passes through any one of the openings in the plate 25 between the fingers 30 and the bars 27, through the fork 41 in the lever 40, over the guides 56 and from the grippers 57 and 63 to the hook 85 at the extreme end of the bars 83 and to the needles. If a thread breaks, the trip mechanism is actuated and the belt is shifted without affecting the grippers, but should the thread be under tension, due to a knot engaging the plate 25 or the thread catching on a bobbin, then the grippers are actuated with the trip mechanism so as to break the thread and stop the machine. As soon as the thread is broken the end leading to the needles is released by its gripper, so that it will continue feeding until the machine stops. The end of the thread leading from the bobbin is preferably held by its gripper, although, in some instances, it may be released.

It will be understood that while I prefer the construction shown in Fig. 8, the grippers may be arranged to slide one toward the other, as illustrated in Fig. 23. 57$^a$ and 63$^a$ are two grippers, the gripper 63$^a$ slides upon its shaft, the rock shaft 98 has two cams 98$^a$ and 98$^b$ thereon which open the jaws of the grippers and a rod 99 can be secured to any moving part to move one gripper from and toward the other.

In some instances the grippers may be pivoted as in Fig. 24. 57$^b$ and 63$^b$ are the two grippers pivoted at 100 and actuated by a rod 99$^a$. The jaws are closed against spring pressure by a cam 101. In Figs. 25 and 26 57$^c$ and 63$^c$ are two pivoted grippers actuated by a cam 102 on a shaft 103, and the jaws are closed by arms 104.

I claim:—

1. The combination in stop motion for knitting machines, of a casing; a shaft connected to the shifting mechanism of the machine; a spring arranged to turn said shaft; lever mechanism for holding the spring in tension; two pairs of jaws; and mechanism under the control of the thread for releasing the lever mechanism to allow the shaft to turn and the thread to be broken by the jaws.

2. The combination of a casing; a vertical shaft mounted thereon; a coiled spring located on the shaft, one end being attached to the casing and the other to the shaft, said shaft being connected to the shifting mechanism of the machine; a compound lever; trip mechanism for holding the spring in tension; two grippers mounted on the frame having movable jaws between which the thread extends; means under the control of the thread for releasing the trip mechanism;

and means connecting the grippers with the spring-actuating shaft so as to cause the grippers to separate to break the thread.

3. The combination of a vertical shaft connected to the shifting mechanism of a machine; a coiled spring; tripping mechanism arranged to hold the spring in tension, said mechanism consisting of a pair of compound levers and a latch; a longitudinal shaft having an arm; a vertical shaft having an arm at one end arranged to be engaged by the arm on the longitudinal shaft and having an arm at the upper end arranged to engage the latch and release the spring when the mechanism is actuated on the breaking of the thread or on the occurrence of a knot.

4. The combination in a stop motion for knitting machines, of a casing; a vertical shaft mounted in the casing; a spring; trip mechanism therefor consisting of a series of levers for holding the spring in tension, said shaft being connected to the shifting mechanism of the machine; a pair of grippers; a bar connecting the grippers; a bar connected to the shaft; and means for coupling the two bars so that, when the spring is released, motion will be imparted to the grippers.

5. The combination in a stop motion for knitting machines, of a casing; a vertical shaft mounted in the casing; a spring; trip mechanism consisting of a series of levers for holding the spring in tension, said shaft being connected to the shifting mechanism of the machine; a pair of grippers; a bar connecting the grippers; a bar connected to the shaft; means for coupling the two bars so that, when the spring is released, motion will be imparted to the grippers; a pivoted lever actuated by the tripping mechanism and controlled by the thread to disengage the grippers from the shaft; and means for returning the grippers to their normal position.

6. The combination in a stop motion for knitting machines, of two grippers each consisting of a pair of jaws between which the thread passes; trip mechanism controlled by the thread by which the jaws are closed upon the thread; and means for actuating the grippers when excessive tension is applied so as to cause the jaws to separate and break the thread.

7. The combination in a stop motion for knitting machines, of two pivoted grippers, each consisting of a pair of jaws between which the thread passes; trip mechanism by which the jaws are closed upon the thread; means for turning the grippers on their pivots to break the thread; and means for holding one of said grippers closed upon the thread while the other is released to allow the thread to be fed to the machine.

8. The combination in a stop motion for knitting machines, of a casing; a shaft connected to the shifting mechanism of the machine; a spring connected to the shaft and to the casing; trip mechanism for holding the shaft in tension; a pair of rotating grippers having jaws arranged to engage the thread; cams for closing said jaws; a rod connecting the two grippers off center; a rod projecting from one of the grippers having a down-turned portion; a rod pivoted to the shaft on one side of the center and having an opening into which the down-turned portion can enter; a spring for moving the jaws in one direction; a thread controlled lever; means between said lever and the trip mechanism for releasing the spring; and an intermediate lever between the first mentioned lever and the rod connected to the grippers so that, when tension is applied to a thread, the gripper rod will be moved into engagement with the rod connected to the spring controlled shaft to allow the jaws to close upon the thread and break it as the shifting mechanism is operated.

9. The combination in a stop motion for knitting machines, of a casing; a shaft connected to the shifting mechanism of the machine; a spring connected to the shaft; trip lever mechanism for holding the spring in tension; a vertical shaft having an arm arranged to trip the mechanism to release the shaft; a horizontal shaft having arms thereon, one of said arms engaging the arm on the vertical shaft, another of said arms being engaged by an arm on the rock shaft controlled by the thread so that, when the thread breaks, the horizontal shaft will be turned; and a third arm controlled by tension mechanism so that, when tension is applied, the rock shaft will be turned to trip the mechanism and release the spring.

10. The combination in a stop motion for knitting machines; of a casing; a shaft connected to the shifting mechanism of the machine; a coiled spring connected to the shaft and to the casing; trip mechanism for holding the spring in tension; a vertical trip shaft and a horizontal trip shaft; with a series of grippers; and a grip rod connected to the shaft and arranged to be coupled to the grippers so that, in the event of tension being applied, due to a knot or the thread catching on a bobbin, the shaft will be released, the machine stopped and that particular thread broken.

11. The combination in a stop motion for knitting machines, of a casing; a vertical shaft mounted in the casing; a coiled spring connected to the shaft and to the casing; compound lever mechanism for retaining the spring under tension, one of said levers having a hook; a trip latch also having a hook engaging the first mentioned hook, said latch being pivoted to the casing; a vertical trip shaft having an arm engaging the trip catch; a spring for holding the latch in engagement with one of the compound levers; a cam on the shaft; a rock shaft mounted in the casing and having an arm bearing against the cam and having a re-setting arm arranged to engage an arm on the trip shaft; a horizontal rock shaft having an arm also engaging an arm on the trip shaft; a thread guide; an arm having bars spaced apart; a rock shaft having fingers arranged to enter the spaces between the bars and to be retained in position by the thread of the machine; an arm on the rock shaft engaging an arm on the horizontal shaft; a second rock shaft extending through the casing and having an arm at each end; a forked lever, the short arm of the lever engaging the arm on the last mentioned rock shaft, the other arm of the lever being forked for the passage of the thread; thread breaking grippers; lever and rod mechanism connecting the grippers with the last mentioned rock shaft and with the spring actuated shaft so that, if the thread should break, the trip mechanism will be actuated without actuating the grippers, but, should excessive tension be applied, the trip mechanism will be actuated and the grippers will be actuated to break the thread.

12. The combination in a stop motion for knitting machines, of a casing; an arm projecting diagonally from the casing; a hook at the end of the arm; a thread guide on the casing; a lever forked at its outer end over which the thread passes; two grippers having pivoted jaws between which the thread passes; trip mechanism for stopping the machine when the thread breaks or a knot occurs, the thread extending from the grippers around the hook on the arm to the knitting machine so as to allow slack for the machine to take up while coming to a stop.

13. The combination in a stop motion for knitting machines, of trip mechanism controlled by a thread; a shaft connected to the shifting mechanism of the machine; a spring for turning said shaft; a cam disk on the shaft; a pivoted lever having a slot therein; a pin on the disk adapted to the slot; a second lever having a slot therein; a pin on the first lever adapted to the slot of the second lever; a trip lever engaging the outer end of the second lever; a second shaft carrying said last mentioned lever so that when the last mentioned lever is turned by the mechanism controlled by the threads it will actuate the trip lever and will release the other levers.

14. The combination in a stop motion for knitting machines, of a casing; a shaft mounted on the casing; a cam disk on the shaft; a spring for turning the shaft; a pin on the cam disk; a slotted lever pivoted to the casing, the pin on the disk entering the slot in the lever; a pin on the lever; a second slotted lever, said pin on the first lever extending into the slot of the second lever, said second lever having a hook at its outer end; a hooked trip lever engaging the hooked end of the second lever and pivoted to the casing, said trip lever having an extended arm; a shaft having an arm adapted to act upon the extended arm of the trip lever when the thread breaks; a second arm on said shaft; a short lock shaft extending through the casing and having two arms thereon, one arm being in the path of the second arm of the last mentioned shaft, the other arm being arranged to engage the cam disk, the parts being so arranged that the mechanism will be reset prior to the main shaft being turned to coil the spring.

FRANK CRAWFORD, Sr.